(12) United States Patent
Chang

(10) Patent No.: US 6,871,738 B2
(45) Date of Patent: Mar. 29, 2005

(54) BOX FOR DISPLAYING CASING RECEIVING COMPACT DISK OR FOR STORING COMPACT DISK

(76) Inventor: Kun-Fa Chang, No. 98, Yung-He Rd., Da-Ya Hsiang, Taichung Hsien (TW)

( * ) Notice: Subject to any disclaimer, the term of this patent is extended or adjusted under 35 U.S.C. 154(b) by 311 days.

(21) Appl. No.: 10/252,161

(22) Filed: Sep. 23, 2002

(65) Prior Publication Data

US 2004/0055911 A1 Mar. 25, 2004

(51) Int. Cl.[7] ............................................. B65D 85/57
(52) U.S. Cl. ..................... 206/232; 206/308.1; 206/814
(58) Field of Search .......................... 206/307.1, 308.1, 206/310, 311, 312, 313, 232, 814, 775, 779

(56) References Cited

U.S. PATENT DOCUMENTS

| | | | | |
|---|---|---|---|---|
| 5,244,084 A | * | 9/1993 | Chan ....................... | 206/308.1 |
| 5,381,894 A | * | 1/1995 | Misterka et al. ............ | 206/310 |
| 5,899,327 A | * | 5/1999 | Sykes ....................... | 206/307.1 |

* cited by examiner

Primary Examiner—Jacob K. Ackun, Jr.
(74) Attorney, Agent, or Firm—Charles E. Baxley

(57) ABSTRACT

A display box includes a base and a cover mountable to the base. A frame together with an extension board is movably connected to the base which has an opening through which a casing for storing a compact disk is inserted and supported on the frame. The frame may also be positioned to seal the opening so that a compact disk can be received in the box safely.

5 Claims, 4 Drawing Sheets

BOX FOR DISPLAYING CASING RECEIVING COMPACT DISK OR FOR STORING COMPACT DISK

FIELD OF THE INVENTION

The present invention relates to a box that has a disengagable frame to which a movable member is connected. A casing for receiving a compact disk may be inserted in the box with a side exposed from an opening of the box, or a compact disk may be received in the box.

BACKGROUND OF THE INVENTION

A conventional box for receiving a casing in which a compact disk is received generally includes a base and a cover which is pivotably connected to the base, and the casing is received in the box. The box is wrapped with plastic film or sealed so that the user cannot access the compact disk in the casing. Nevertheless, in a video rent store, there are a lot of display boxes needed so as to display the casings, and display boxes are purchased and used to display the casings. The display boxes have only one function which is the display of the casing. The display boxes cannot used to store compact disks because there is no proper structure to position the compact disks.

The present invention intends to provide a box that has two functions which may be used to display a casing or may be used to store a compact disk.

SUMMARY OF THE INVENTION

In accordance with one aspect of the present invention, there is provided a box which comprises a base having an opening defined in one side thereof, and a cover mountable to the base. A plurality of engaging members are connected to two opposite insides of the base and two of the engaging members are located close to the opening. A frame comprises a cross plate and an extension board. Two engaging ends are located on two ends of the frame and engaged with the engaging members on the two opposite insides of the base. Two protrusions extend from two ends of the extension board. A movable member has a plate and two slots are defined in two sides of the movable member. The two protrusions are movably engaged with the two slots and an annular engaging flange extends from a surface of the plate.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
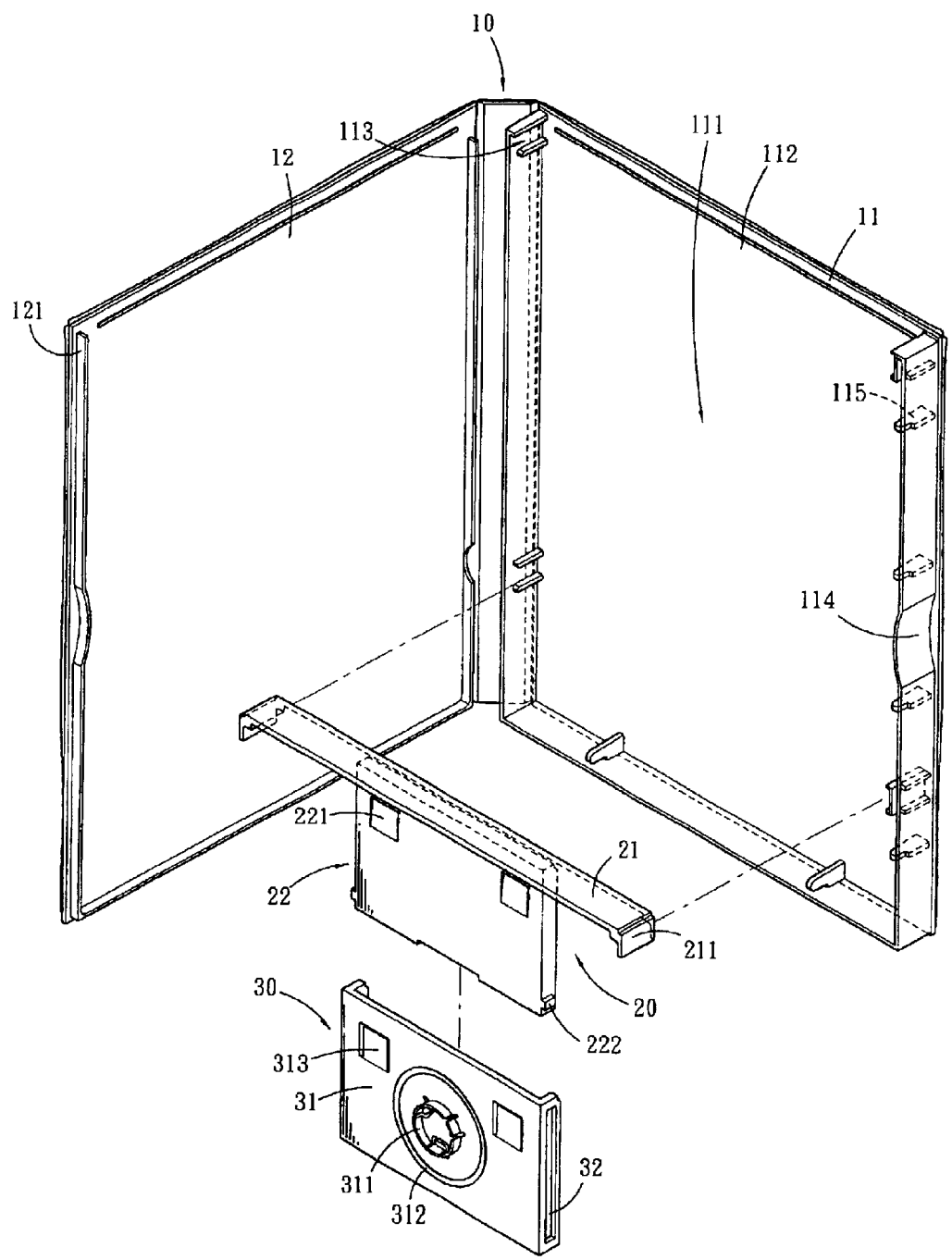
FIG. 1 is an exploded view to show the display and storing box of the present invention.
Figure 2:
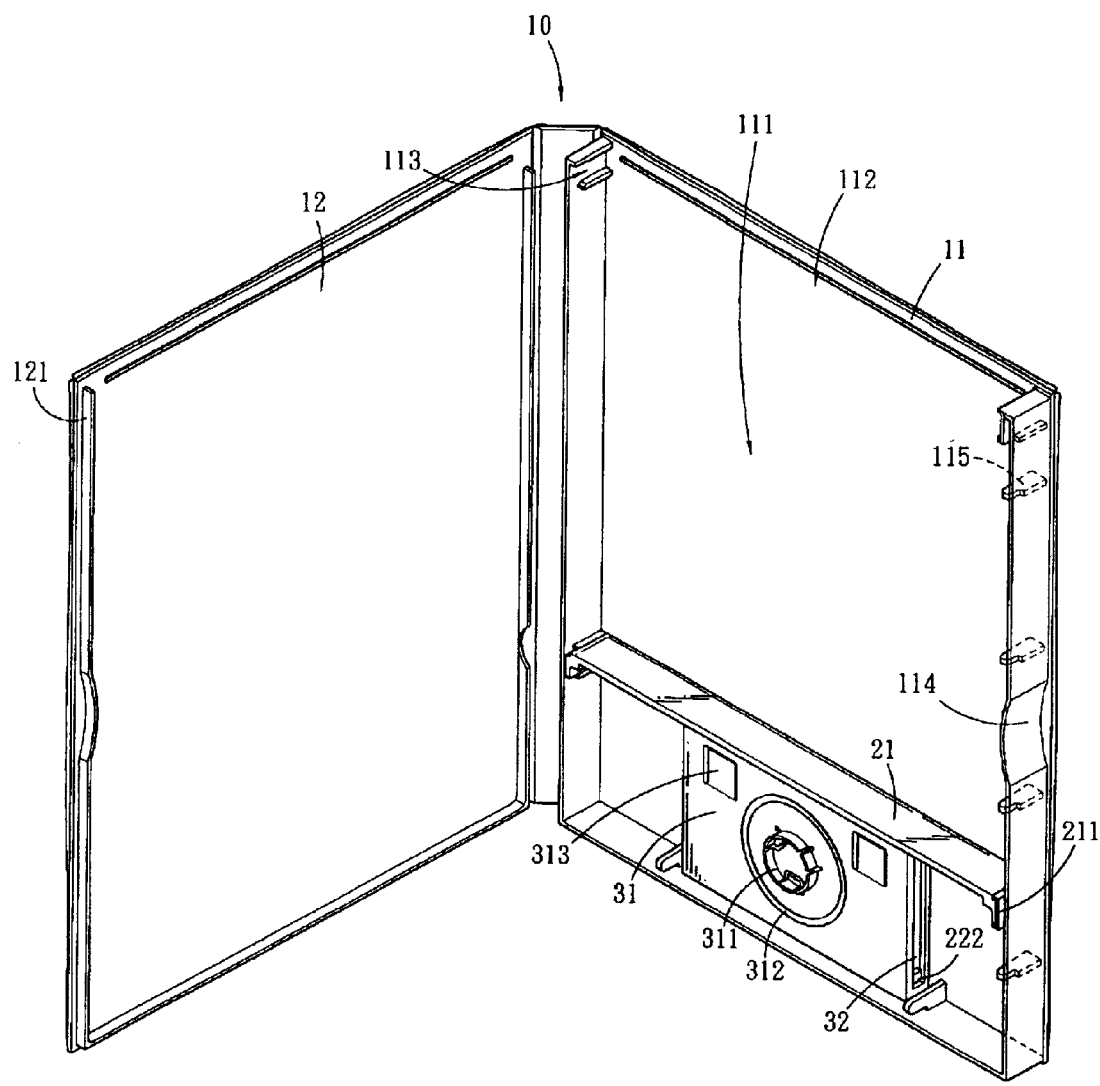
FIG. 2 is a perspective view to show the frame is positioned in the base of the box of the present invention.
Figure 3:
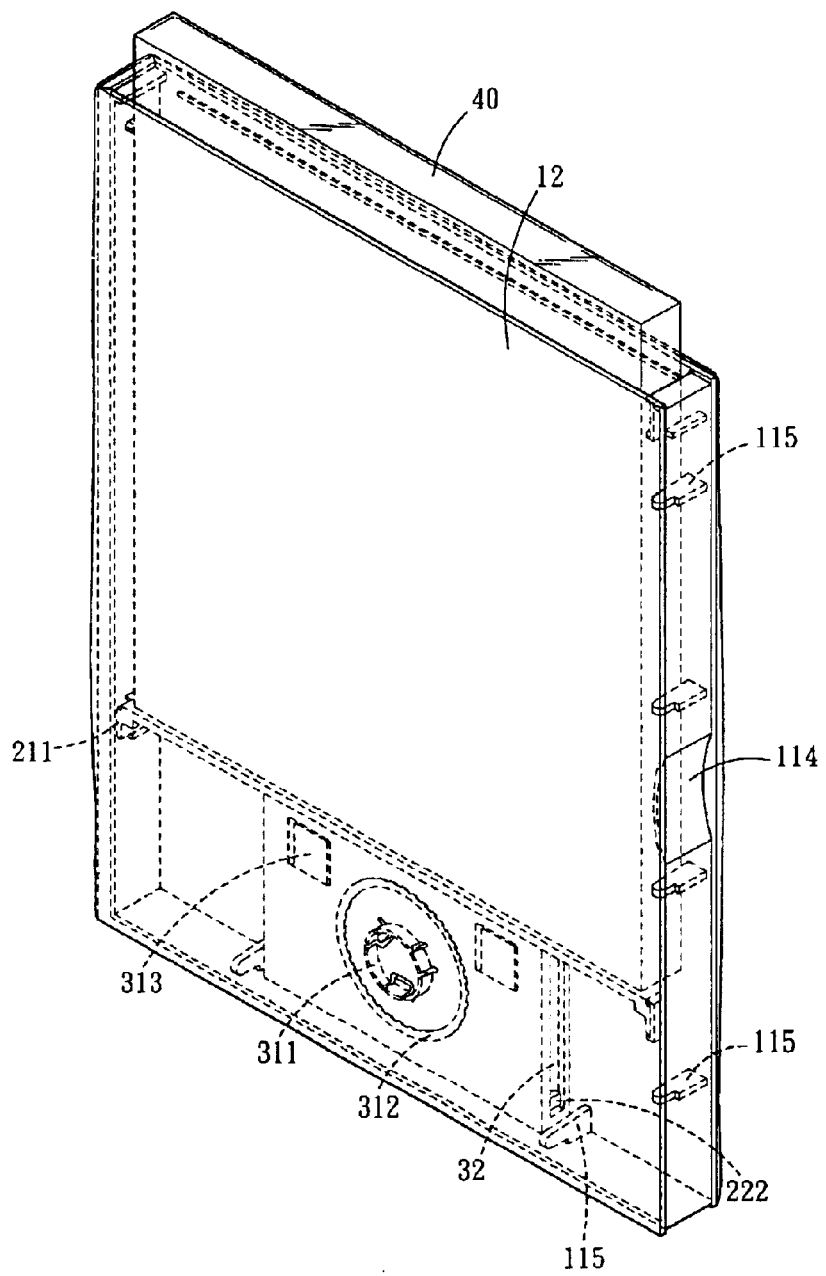
FIG. 3 shows a casing for storing a compact disk is inserted in the opening of the box of the present invention.

Referring to FIGS. 1 and 2, the box 10 of the present invention comprises a base 11 and a cover 20 which is mounted to the base 11. A receiving space 111 is defined in the base 11 and an opening 112 is defined in one side of the base 11 so that when the cover 20 is mounted to the base 11, the opening 112 is accessible from outside so that a casing 40 for receiving a compact disk can be inserted in the box 10 via the opening 112 as shown in FIG. 3. A plurality of engaging members 113 are connected to two opposite insides of the base 11 and two of the engaging members 113 are located close to the opening 112. The cover 20 has a wall 121 extending from an inside of the cover 12 and being shaped corresponding to the sides of the base 11 so as to seal the periphery of the box 10. The base 11 has a recessed area 114 defined in one side thereof so that a finger of a user may be inserted in the recessed area 114 to open the cover 12. A plurality of stops 115 extend inward from each of the insides of the base 11 and urge the casing 40 to position the casing 40 in the box 10.

A frame 20 movably received in the base 11 comprises a cross plate 21 and an extension board 22. Two engaging ends 211 are located on two ends of the frame 20 and engaged with the engaging members 113 on the two opposite insides of the base 11. Two protrusions 222 extend from two ends of the extension board 22. A movable member 30 had a plate 31 and two slots 32 are defined in two sides of the movable member 30. The two protrusions 222 are movably engaged with the two slots 32 so that the movable member 30 can be slid relative to the cross plate 21. An annular engaging flange 311 and an annular ridge 312 extend from a surface of the plate 31 so as to position a compact disk 50 as shown in FIG. 5.

The extension board 22 has two recesses 221 defined in a surface thereof and the plate 31 of the movably member 30 has two convex portions 313 which are engaged with the recesses 221 in the extension board 22 so that the plate 31 of the movable member 30 can be positioned.

As shown in FIG. 3, when the box 10 is used as a display box, the casing 40 for receiving a compact disk or the like is inserted in the box 10 via the opening 112 when the box 10 is in close status, and the back where a title of the compact disk is attached can be exposed from the opening 112 so that the customers can see the title clearly. The front end of the casing 40 is supported on the cross plate 21.

Figure 4:
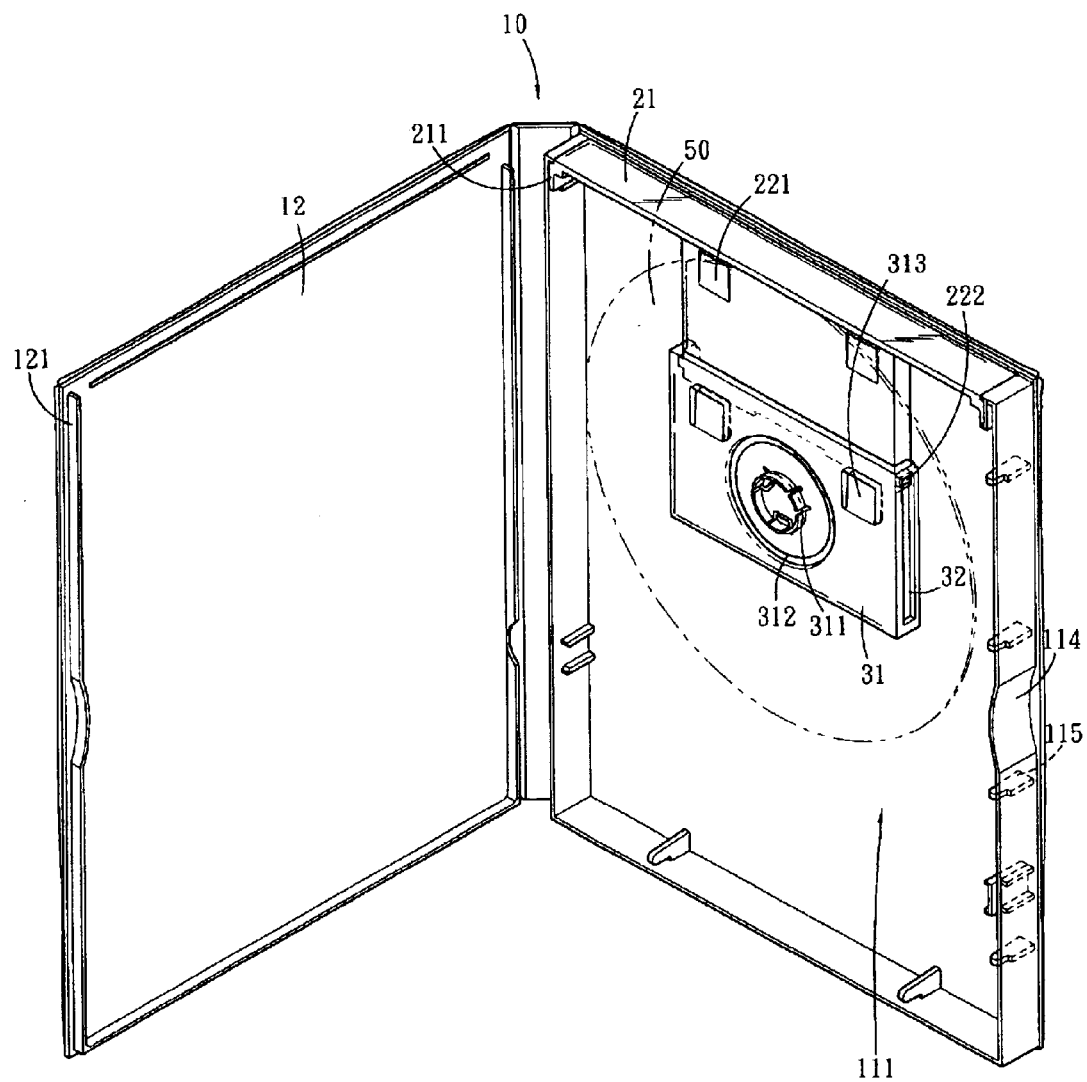
FIG. 4 shows a compact disk is stored in the box of the present invention.

As shown in FIG. 4, when the box 10 is used as a compact disk storing box, the cross plate 21 is moved to the engaging members 113 located close to the opening 112. The opening 112 is then sealed and the plate 31 is slid to a remote position relative to the cross plate 21, a compact disk 50 can be positioned on the annular flange 311. The distance between the cross plate 21 and the annular flange 311 is a radius of a compact disk 50.

The box 10 has two functions so that the owner can use the boxes 10 as desired to reduce purchasing of conventional boxes that have only one function.

While we have shown and described the embodiment in accordance with the present invention, it should be clear to those skilled in the art that further embodiments may be made without departing from the scope of the present invention.

What is claimed is:

1. A box comprising:

a base and a cover, a receiving space defined in the base and an opening defined in one side of the base, a plurality of engaging members connected to two opposite insides of the base and two of the engaging members located close to the opening, the cover being mountable to the base;

a frame comprising a cross plate and an extension board, two engaging ends on two ends of the frame and engaged with the engaging members on the two opposite insides of the base, two protrusions extending from two ends of the extension board, and a movable member having plate and two slots on two sides of the movable member, the two protrusions movably engaged with the two slots, an annular engaging flange extending from a surface of the plate.

2. The box as claimed in claim 1, wherein the base has a recessed area defined in one side thereof.

3. The box as claimed in claim 1 further comprising a plurality of stops extending inward from each of the insides of the base.

4. The box as claimed in claim 1, wherein a wall extends from an inside of the cover and has a shape corresponding to the sides of the base.

5. The device as claimed in claim 1, wherein the extension board has recesses defined in a surface thereof and the plate of the movable member has convex portions which are engaged with the recesses in the extension board.

* * * * *